United States Patent Office 3,392,138
Patented July 9, 1968

3,392,138
EPOXY RESIN COMPOSITION FOR
PRODUCING SHELL CORES
John L. Dewey, Walnut Creek, Calif., assignor to The
Dow Chemical Company, Midland, Mich., a corporation of Delaware
No Drawing. Filed Apr. 6, 1964, Ser. No. 357,760
7 Claims. (Cl. 260—37)

ABSTRACT OF THE DISCLOSURE

This invention is directed at a process for producing a curable resin finding particular utility in preparing free-flowing shell molding sand, said process comprising (1) the dissolving of a blend of epoxy resins in a solvent, said blend consisting of (a) a diglycidyl ether of 2,2-bis(4-hydroxyphenyl)propane having an epoxide equivalent weight between 450 and 600 and (b) an epoxidized novolac resin having an epoxide equivalent weight between 175 and 182 and a viscosity between 30,000 and 90,000 centipoises at 125° F., said blend of epoxy resins comprising between about 2.5 and 3.5 parts by weight of said diglycidyl ether of 2,2-bis(4-hydroxyphenyl)propane per part of said epoxidized novolac resin and (c) between about 9 and 15 parts of methylated bicyclo(2,2,1)hept-5-ene-2,3-dicarboxylic anhydride per hundred parts of said epoxy resin blend; said solvent comprising a relatively non-toxic chlorinated alkane having a boiling point between about 30° and 90° C. at atmospheric pressure; (2) thereafter incorporating into said blend about 12 to 25 parts of a liquid mixture of amines per hundred parts of said epoxy resin blend, said amine mixture consisting of between about 1.4 and 1.6 parts of meta-phenylenediamine for each part of p,p'-methylenedianiline.

This invention relates to the art of casting with shell cores and molds and more particularly to a resin which is useful as a binder for foundry sand for the preparation of shell cores and molds.

The shell core casting process offers numerous advantages over former methods such as that of casting with solid cores. Aside from a reduction in the dust problem associated with the core preparation, the venting of gases during the casting step has been simplified by the greater permeability of the thin walls of shell cores. Additionally the decomposition of the resinous binder in the shell cores at the temperature of the molten metal facilitates the removal of the sand residue from the cast article.

It generally is desirable to make shell cores using as low a concentration of binder resin as possible. Other than the savings in the cost of the resin, a lower resin content results in higher gas permeability and produces smaller volumes of gas in the decomposition of the resin, thereby reducing the possibility that the casting may be ruptured by the sudden formation of gases. On the other hand the resin content of the thin walled cores should be sufficient to hold the shell intact under the fluid pressure of the molten metal. Thermal decomposition of the binder should not occur to a significant degree until the metal adjacent to the core has solidified sufficiently to be self-supporting.

Resins commonly used to bind the sand grains in shell cores are those of phenol-formaldehyde, phenol-furfural, melamine-formaldehyde and urea-formaldehyde. Sand is coated with these resins to produce a free-flowing sand suitable for the preparation of shell cores and molds either by mixing the sand with a solution of the resin in a volatile solvent or by mixing the resin with sand preheated to the melting temperature of the resin. These methods of preparing molding sand have some disadvantages. The mixing of resin with hot sand is inconvenient and requires special handling equipment as well as personnel protective equipment. The use of the common effective solvents is hazardous in that they are flammable and may produce explosive mixtures with the air. Additionally the sand and resin mixtures tend to become balled up as the solvent is removed. A further problem is that of the noxious vapors evolved during the casting operation, particularly from the phenolic resins, which necessitate efficient ventilation of the casting area. Condensing agents such as hexamethylenetetramine frequently used in curing these resins produce a dermatitis with many persons when they are exposed to the vapors. This is a serious problem in foundry practice.

Attempts have been made to use epoxy resins as the binder for shell cores to overcome some of the undesirable characteristics of the phenolics. Previous efforts in this change have met with several problems.

The desirable properties which were sought in the epoxy binder include a high degree of hardness along with a high tensile strength, even at relatively low concentrations of resin in the sand. The resin-coated sand should remain loose and free-flowing after storage for long periods of time at room temperature or slightly elevated temperatures. On the other hand the resin should melt within a narrow temperature range, sticking the grains together adjacent a heated mold pattern so that excess sand can be dumped from the shell core following a brief dwell time, leaving the thin shell of sand and resin on the pattern. Thereafter it should be possible to effect the final cure or thermal setting of the shell core by a brief additional dwell time in the pattern at 400–450° F. It is also desirable that the resin-producing components by soluble in a volatile, non-flammable and relatively non-toxic solvent, nor should they be dermatitic.

According to this invention a foundry sand is coated with a mixture of epoxy resins and curing agents to produce a free-flowing material particularly suited to the preparation of shell cores and molds. This unique resin mixture is a combination of two normally solid, low melting epoxy resins, the diglycidyl ether of 2,2-bis(4-hydroxyphenyl)propane, also known as the diglycidyl ether of Bisphenol A, and an epoxidized novolac resin. The cure of this resin mixture is effected by the combination of curing agents comprising the methylated bicyclo(2,2,1)hept-5-ene-2,3-dicarboxylic anhydride and an aromatic amine consisting of the eutectic mixture containing 40 parts by weight of p,p-methylenedianiline and 60 parts of meta-phenylenediamine. This resin formulation provides a melt or stick temperature in the desired range of 205 to 215° F. with the cure or thermal setting occurring after further heating at 425–450° F. for about 15 seconds. Separate solutions of the resin mixture and curing agents are stable for long periods of time at temperatures up to 135° F. and can be prepared well in advance of the time they are to be used in coating sand.

Foundry sand is easily coated with these solutions and the solvent removed therefrom without balling or becoming doughy. Also the sand can be mixed with the resin-producing materials without the use of mixing promoters or other techniques commonly used to reduce balling tendencies. Moreover, sand coated first with this resin mixture and curing agents remains free-flowing for long periods of time at temperatures up to about 150° F.

The diglycidyl ether of Bisphenol A which may be used in accordance with this invention is a normally solid resin having an epoxide equivalent weight between about 450 and 600 and a Durran's softening point between about 70 and 80° C. The epoxidized novolac which is used in combination with the bisphenol resin is that produced by the epoxidation with epichlorohydrin and caustic of a novolac obtained by the condensation of phenol with formaldehyde, the condensate containing from 3 to 4 phenolic groups linked by methylene bridges, and the epoxidized novolac containing from 3 to 4 epoxy groups per molecule. The epoxidized novolac has an epoxide equivalent weight between about 175 and 182 and a viscosity between 30,000 and 90,000 centipoises at 125° F. These resins, when used in a ratio of about 2.5 to 3.5 parts by weight of the bisphenol resin to one part of the novolac, provide the desired resin characteristics. Mixtures having a higher novolac content have inadequate hardness and tensile strength. The melt and cure temperatures are too high in mixtures containing a higher ratio of the bisphenol resin. The longer dwell times associated with the higher melt and cure temperatures are undesirable in that they reduce the productive capacity of equipment used in manufacturing shell cores and molds.

The epoxy resin mixture is dissolved in a non-flammable solvent which is easily volatilized after the solution has been mixed with foundry sand. Methylene chloride has been found to be a particularly satisfactory non-flammable solvent for these resins and is relatively non-toxic. Other volatile non-flammable solvents which may be used are 1,1-dichloroethane, propyl chloride, isopropyl chloride and 1,1,1-trichloroethane. Less volatile but otherwise suitable solvents are isobutyl chloride, trichloroethylene and 2,2-dichloropropane. Although carbon tetrachloride and chloroform are both good solvents, they are not recommended owing to their toxicity. Likewise, ketones such as methyl ethyl ketone have good solvent properties but are undesirable because of their flammability. In general any of the chlorinated alkanes having a boiling point between about 30° and 90° C. at atmospheric pressure and which are relatively non-toxic may be used as solvents. Solutions having a solvent content between about 50 and 60 weight percent have satisfactory fluidity and are easily mixed with the sand. Higher solvent contents can be used but they are of no particular benefit and tend to increase the mixing time, equipment costs, etc. Solvent contents lower than about 50 percent, e.g. 35–40 percent, can be used, however more energy is required to disperse the solution uniformly on the sand.

Although numerous anhydrides are known to cure epoxy resins, methylated bicyclo(2,2,1)hept-5-ene-2,3-dicarboxylic anhydride, known commercially as methyl Nadic anhydride and obtained as the Diels-Alder adduct of methylcyclopentadiene and maleic anhydride, is uniquely adapted to this shell molding composition in that it cross-links the resin only at the high temperature of the curing process, imparting hardness and heat stability without increasing the melt or stick point of the uncured resin mixture. The anhydride may be dissolved with the epoxy resins in the methylene chloride or it may be added with the eutectic amine mixture immediately preceding the coating operation. Between about 9 and 15 parts of the anhydride per 100 parts of the epoxy resin mixture are required to obtain the desired properties of the shell core sand.

The amine curing agents may be melted to produce the eutectic mixture which remains liquid at ordinary room temperatures. In this form they may be added to sand which has been coated with the resin mixture or they may be diluted with a solvent such as methylene chloride, acetone or methyl ethyl ketone before mixing with the resin coated sand. The eutectic mixture is a 1:1.5 weight ratio of p,p-methylenedianiline to meta-phenylenediamine, however ratios between about 1:1.4 and 1:1.6 may be used with equal facility if a small amount of a solvent such as methyl ethyl ketone is added to increase the fluidity. It is preferable to avoid contact of the amines with halogenated solvents prior to the sand coating step. About 12 to 25 parts of the mixed amines per 100 parts of epoxy resin provide the desired rate and extent of cure. The cure may be accelerated by the addition of a small amount of a tertiary amine, e.g. 0.1–0.6 part of benzyl dimethylamine per 100 parts of resin.

The method of preparing shell cores with this unique resin mixture can be illustrated by referring to the following example of a preferred embodiment of the invention.

EXAMPLE 1

A stable resin solution was prepared by combining 525 parts by weight of a diglycidyl ether of Bisphenol A having an epoxide equivalent weight between 475 and 525 and a Durran's softening point of 70–78° C., 175 parts of an epoxidized novolac having an epoxide equivalent weight of 175–182 and a viscosity between 30,000 and 90,000 centipoises at 125° F., 75 parts of methyl Nadic anhydride and 870 parts of methylene chloride then heating the solution to about 35° C.

A fluid curing agent mixture was prepared by mixing 160 parts by weight of p,p-methylenedianiline and 240 parts of meta-phenylenediamine. These were melted together at 110 to 115° C. until a homogeneous eutectic mixture was obtained which remained liquid at 20° C.

Two thousand parts by weight of a clean silica sand (AFS No. 110–120) were mixed for one minute with 10 parts of a powdered iron oxide which is commonly used to give sand molds greater heat strength. Fifty parts of the above epoxy resin solution was added to the sand and mixed for 35 seconds then 3 parts of the liquefied amine mixture was added and the mixing continued for 1.5 minutes. This mixing was carried out in a ventilated chamber so that substantially all of the solvent had been volatilized at this time. 1.5 parts of calcium stearate was blended into the coated sand to insure flowability. Following a final one minute mixing period, the mixture was screened through a 28 mesh screen. From the above it can be seen that the solvent in the resin solution vaporizes rapidly at these mixing conditions without the sand balling up or becoming doughy.

The stick or melt point of this coated sand was found to be between 205 and 215° F. The stick point used herein is the minimum temperature at which sticking will occur after one minute when a sample of the coated sand is placed on a heated metal bar connected to a pyrometer.

The sand mixture was allowed to flow into a cylindrical cavity in an aluminum pattern which had been coated with a standard silicone mold lubricant and heated to 440° F. After 25 seconds dwell time the unbonded portion of the sand was dumped from the pattern, i.e. peel back was effected. After an additional heating period of 15 seconds at about 440° F. the pattern was separated and removed from the shell core of bonded sand. The shell, shaped like a cylindrical drinking glass 5 inches tall and 3 inches in diameter, had a uniform thickness of about $\frac{3}{16}$ inch.

Test specimens prepared from this coated sand and cured at 440° F. for one minute had tensile strengths between 475 and 525 lbs./sq. in. and scratch hardness between 88 and 92 as determined by standard AFS test with No. 673 Harry Dietert Scratch Hardness Tester.

The above shell core contained approximately 1.3 weight percent of the resin composition, representing a substantial reduction in resin content from the 5 to 7 percent ordinarily used with the phenolic resins and sands in this particle size range. Also the reduction was not made at the sacrifice of strength of the mold. As little as from 1.0 to 1.5 parts of the resin composition per 100 parts of sand may be used to produce strong cores with coarse sands having particle sizes in the range 65–100 AFS. The finer sands having particle sizes of 100–150 AFS usually require from 1.5 to 2.0 parts of the resin composition per 100 parts of sand to produce shell molds having comparable strength.

In the above example calcium stearate was added as a fluidizing agent in accordance with conventional foundry practice. Other metal soaps which may be used in a similar manner include the stearates of zinc, aluminum, cadmium, magnesium, iron, and barium as well as the corresponding metal oleates and palmitates. Resin coated sands which have been treated with a small quantity of one of these soaps are less likely to become caked during long periods of storage. Also the sand flows through small passages and crevices in mold patterns more readily, reducing the need for vibration to insure complete filling of the pattern voids. As little as about 0.1 to 0.2 part of the soap per 100 parts of sand is effective. Foundry sands coated with resins taught in the prior art not only have a greater tendency to lump and ball under normal conditions of temperature and humidity but they cannot be kept free flowing under abnormal conditions of temperature and humidity, even in the presence of particle lubricants or fluidizing agents such as calcium stearate.

Although methylene chloride and other non-flammable solvents have been taught as the preferred solvents for the resin mixture and curing agents, it should be understood that minor amounts of flammable solvents such as acetone and methyl ethyl ketone may be used in combination with the non-flammable solvents without producing a flammable mixture.

Shell cores produced according to this invention have good storage properties. The resin binder does not show signs of deterioration even after it has been exposed to high humidity over a long period of time.

I claim:

1. A free-flowing shell molding sand comprising a foundry sand coated with about one to two parts of a thermosettable resin system per 100 parts of said foundry sand, said resin system comprising: (1) a mixture of epoxy resins consisting of one part of an epoxidized novolac resin having an epoxide equivalent weight between 175 and 182 and a viscosity between 30,000 and 90,000 centipoises at 125° F. and from 2.5 to 3.5 parts of a diglycidyl ether of 2,2-bis(4-hydroxyphenyl)propane having an epoxide equivalent weight between 450 and 600 and a Durran's softening point between 70 and 80° C.; (2) between 9 and 15 parts per 100 parts of said epoxy resin mixture of methylated bicyclo(2,2,1)hept-5-ene-2,3-dicarboxylic anhydride; and (3) between about 12 and 25 parts per 100 parts of said epoxy resins of an amine mixture consisting of p,p'-methylenedianiline and meta-phenylenediamine in the ratio of 1.4 to 1.6 parts of said meta-phenylenediamine per part of said p,p'-methylenedianiline, the amine content of said resin system corresponding to about 12 to 25 parts per 100 parts of said epoxy resin mixture.

2. A shell molding sand according to claim 1 wherein said thermosettable resin system contains between 0.1 and 0.6 part per 100 parts resin of benzyldimethylamine.

3. A shell molding sand according to claim 1 wherein said resin coated sand is blended with from 0.1 to 0.2 part of a metal soap per 100 parts of said coated sand.

4. A cured resin prepared by the process which comprises in sequence (1) dissolving a blend of epoxy resins in a solvent, said blend consisting of (a) a diglycidyl ether of 2,2-bis(4-hydroxyphenyl)propane having an epoxide equivalent weight between 450 and 600 and a Durran's softening point between 70 and 80° C. and (b) an epoxidized novolac resin having an epoxide equivalent weight between 175 and 182 and a viscosity between 30,000 and 90,000 centipoises at 125° F., said blend of epoxy resins comprising between about 2.5 and 3.5 parts by weight of said diglycidyl ether of 2,2-bis(4-hydroxyphenyl)propane per part of said epoxidized novolac resin and (c) between about 9 and 15 parts of methylated bicyclo(2,2,1)hept-5-ene-2,3-dicarboxylic anhydride per hundred parts of said epoxy resin blend; said solvent comprising a relatively non-toxic chlorinated alkane having a boiling point between about 30° and 90° C. at atmospheric pressure, (2) thereafter incorporating into said blend about 12 to 25 parts of a liquid mixture of amines per hundred parts of said epoxy resin blend, said amine mixture consisting of between about 1.4 and 1.6 parts of meta-phenylenediamine for each part of p,p'-methylenedianiline, (3) removing the solvent from the composition and (4) curing the above composition at 425–450° F. for at least 15 seconds.

5. The process claimed in claim 4 wherein said amine mixture contains between 0.1 and 0.6 part benzyldimethylamine per 100 parts of said mixture of epoxy resins.

6. The process claimed in claim 4 wherein said solvent comprises between 50 and 60 weight percent of said solution.

7. The process claimed in claim 4 wherein said amine mixture is an eutectic mixture consisting of 1.5 parts of said meta-phenylenediamine per part of said p,p'-methylenedianiline.

References Cited
UNITED STATES PATENTS

| | | | |
|---|---|---|---|
| 2,981,711 | 4/1961 | Meyer et al. | 260—831 |
| 2,989,498 | 6/1961 | Mackenzie et al. | 260—37 |
| 3,051,681 | 8/1962 | Partansky | 260—832 |
| 2,637,716 | 5/1953 | Ott | 260—32.8 |
| 3,268,974 | 8/1966 | Childs | 260—831 |

OTHER REFERENCES

H. Lee and K. Neville, "Epoxy Resins," McGraw-Hill Book Co., New York, 1957. Pages 116–118 and 272 relied upon.

J. FROME, *Primary Examiner.*

J. E. CALLAGHAN, *Assistant Examiner.*